3,409,394
METHOD OF PRODUCING PHOSPHATE GRAN-
ULES BY REACTING PHOSPHORIC ACID AND
A CARBONATE WITH CONTROLLED REAC-
TION TIMES
James P. Sprigg, 5233 Randolph St.,
Los Angeles, Calif. 90022
No Drawing. Continuation-in-part of application Ser. No.
252,617, Jan. 21, 1963. This application Dec. 22, 1967,
Ser. No. 692,723
10 Claims. (Cl. 23—109)

ABSTRACT OF THE DISCLOSURE

This disclosure describes a method for producing phosphates such as calcium phosphate which includes mixing an acid of phosphorus and a carbonate to form a slurry. Mixing is terminated and the mixture is placed in a quiescent state before substantial reaction has occurred. The porous mass formed as a result of the reaction in the quiescent state is easily broken up into granules without the use of a special crusher. The method may be carried out as a batch process or continuously.

This application is a continuation-in-part of my applications Ser. Nos. 252,617, filed Jan. 21, 1963, now abandoned and 674,986, filed Oct. 12, 1967. The disclosures of these two applications are hereby incorporated by reference in this application.

Background of the invention

The use of phosphate salts such as calcium phosphate as animal feed additives is well known. In order that these salts be easily mixed with feed, it is beneficial that they be supplied in granular form. However, it has been relatively difficult and costly to produce a granular form because the normal process for producing such salts results in the formation of a solid slab which it is necessary to crush in special crushing apparatus. Screening and re-crushing of oversized particles also add to the difficulty. This crushing step increases the cost of processing equipment and lengthens processing time. Additional equipment expense is required to obtain a product of uniform particle size because of the necessity of recycling over-sized and undersized particles.

A typical method employed by the prior art for carrying out the production of calcium phosphate is to place calcium carbonate in an aqueous solution of phosphoric acid to obtain dicalcium phosphate according to the following equation:

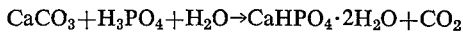

$$CaCO_3 + H_3PO_4 + H_2O \rightarrow CaHPO_4 \cdot 2H_2O + CO_2$$

After evaporation of the excess water in the process, the resulting product is in the form of a hard chunk having the aforementioned disadvantages.

Another method for producing calcium phosphate is described in U.S. Patent No. 3,236,593 to Hartmann. Hartmann discloses the addition of concentrated phosphoric acid to calcium carbonate followed by long periods of mixing and ripening.

Summary

It is an object of the present invention to provide a method of making phosphates.

It is a further object of the present invention to provide a method for making phosphates which can be easily formed into small granules.

It is a further important object of the present invention to provide a method of making phosphates having a short reaction time.

These and further objects of the invention will be obvious by reference to the disclosure which follows.

The present invention is based upon the discovery that a very friable, easily granulated reaction mass is formed if substantially the entire reaction is allowed to proceed while the reaction mass is maintained in the quiescent state. According to the present invention, the phosphoric acid and carbonate are rapidly mixed and then mixing is terminated before any substantial reaction takes place. The reaction mass is maintained in the quiescent state until the reaction is essentially completed and the resulting calcium phosphate product is a friable mass which may be easily granulated to a small particle size.

The present invention provides a process which differs significantly from that disclosed by Hartmann in that Hartmann teaches that rapid mixing should be maintained during the entire reaction. Also, the present reaction is carried out in a relatively short time, about ½ hour, as compared with long reaction times of about 6–48 hours according to the Hartmann process. Additionally, the Hartmann process requires that the calcium carbonate used be of a very small particle size, i.e., 60 microns, which necessitates expensive grinding. The present invention can make use of much coarser commercial grade calcium carbonate.

Description of preferred embodiments

The process of the present invention is directed to the reaction of a carbonate with a phosphate. Of particular interest is the reaction of phosphoric acid with calcium carbonate to form calcium phosphate. The type of calcium phosphate will vary with the amount of water present and with other process variables. The reaction product of the present invention may thus contain monocalcium phosphate, $CaH_4(PO_4)_2$, dicalcium phosphate, $CaHPO_4$, or tricalcium phosphate, $Ca_3(PO_4)_2$. Normally the product is predominantly dicalcium phosphate in the hydrated form. The anhydrous form may be obtained by driving water off at an elevated temperature.

In general, the reaction is applicable to any metal carbonate. Carbonates which may be used include calcium carbonate, sodium carbonate, potassium carbonate, cobalt carbonate, magnesium carbonate, and manganese carbonate. Calcium carbonate is preferred because calcium is an inexpensive material with which to introduce phosphate into feeds and calcium may be used in large quantities in feed.

The phosphate is normally supplied by phosphoric acid. Eighty-four percent phosphoric acid contains the necessary amount of water to react with calcium carbonate to form dicalcium phosphate on a stoichoimetric basis. Any water in excess of that provided by 84.5% phosphoric acid is in excess of that required for further reaction and must be driven off to form a dry product. Removal of excess water may be accomplished through the inclusion of calcium oxide in the reaction. The calcium oxide is also converted to a calcium phosphate but it initially evolves a great amount of heat because of hydration to calcium hydroxide. This heat of hydration may be used to drive out excess water. In practicing the invention, the amount of calcium oxide included in the calcium carbonate may vary from about 10% to 90% by weight of the calcium carbonate. Other acids may be used to form calcium salts other than phosphates.

In carrying out the process of this invention, the first important step is mixing of the carbonate, e.g., calcium carbonate, and phosphate, e.g., phosphoric acid. Initial mixing is necessary to assure contact of the phosphoric acid with all of the calcium carbonate. The mixing, although vigorous enough to assure good contact between the reactants, must be terminated before any substantial degree of reaction takes place between the components and before the peak of the reaction. Shortly after contacting the reactants, the peak of the reaction occurs. At that point, the maximum reaction rate is reached, the reaction temperature approaches that of boiling water and gases including carbon dioxide and steam are rapidly given off by the reaction mass. Thus, it has been shown that if mixing is allowed to take place during the peak of reaction, an undesirable product which requires an excessive amount of grinding, etc., is obtained. However, by terminating the mixing prior to the peak, i.e., prior to any substantial reaction, a product which is easily formed into granules is obtained. Mixing should be terminated within about one minute and preferably within about thirty seconds. Of course, the time for the peak of the reaction to occur will vary depending on the temperature, completeness of mixing, particle size of calcium carbonate and ratio of reactants. However, for any set of parameters, the peak of the reaction is easily determined by observation and the mixing time can be adjusted to terminate prior to the peak.

Mixing is stopped while the reaction mixture is still in a fluid condition. The viscosity of the mixture will depend upon the water content of the phosphoric acid used, 85% phosphoric acid resulting in a material having the fluidity of split pea soup. Acid concentrations in the range of about 75% to about 85% will produce a thick fluid. All commercial acids may be used although dilution with water may be necessary for highly concentrated acids.

Mixing may be carried out in any suitable mixer, e.g., a rotary mixer, blade mixer, disc mixer, etc. However, mixing must be carried out so that the porosity of the reaction mass is not affected. It has been found that a rotary or drum mixer is preferred since it provides good contact of the reactants and yet is fairly gentle in its action. A blade may tend to cause a compacting of the reactants which tends to result in the formation of a harder more dense final product which is difficult to granulate.

The second step of the present invention is maintenance of the reaction mixture in a quiescent state during substantially the entire period of the reaction. After the initial mixing, the slurry of reactants is normally still relatively cool, below the boiling point of water. The mixing is preferably stopped before the temperature reaches the boiling point of water. At the boiling point, which is reached during the peak of the reaction, large quantities of steam escape, the whole reaction mass surges and contracts with the escape of carbon dioxide and a great deal of heat is generated. It is the escape of the gases, carbon dioxide and water vapor, which is at least in part responsible for the formation of a porous and easily granulated product. During the reaction stage, the volume of the reacting materials is approximately twice that of the final product. At ambient temperature, the normal reaction time for a substantially complete reaction is about 30 minutes. After the reaction has subsided, the reaction mass can be easily crumbled into a usable granular product.

The reaction mass may be maintained in a quiescent state by merely placing it in a vessel which is not agitated or stirred. One simple method of carrying out the reaction is to use a rotary drum mixer for the initial mixing stages and then to stop rotation and allow the reaction to occur in the quiescent state in the mixer. After completion of the reaction, the rotation of the mixer can be resumed to cause crumbling of the reaction mass into the desired small granular size. If desired, the reaction mass can be removed from the mixer to another vessel where it is maintained in the quiescent state. A continuous process for forming the calcium phosphate may include continuous mixing in a rotary drum mixer with continuous discharge into reaction vessels which maintain the reaction mixture in a quiescent state but move slowly on a continuous belt. The time of travel on the belt in the quiescent state is set so that when the vessel reaches the end of the belt, the reaction is complete. Merely dropping the reaction mass from the vesesl a short distance is normally sufficient to break up and granulate the reaction mass to provide the final product.

The reaction product should preferably be broken up before it solidifies into a hard mass. As previously indicated, the product is easily granulated after about ½ hour. If it is allowed to stand for a prolonged period, the product will become hard and be more difficult to break up. However, the reaction product remains highly porous, even if allowed to stand for a prolonged period and thus is granulated much more readily than the prior art products.

As already indicated, granulating the reaction mass to form the desired small particles is easily accomplished when the reaction mass is formed according to the process of the present invention. Any slight crushing or jarring of the reaction mass such as revolving it in a rotary drum mixer, dropping it, etc., is normally satisfactory. The size of the final calcium phosphate particles are normally about the same size as the calcium carbonate particles used in the reaction.

The process of the present invention can be more readily understood by reference to the following examples.

Example 1

A one-ton rotary drum, batch mixer, was filled with 80 parts by weight of a limestone having a particle size of about 12–30 mesh and about 11 parts by weight of calcium oxide. The mixer was rotated at about 8 r.p.m. and 123 parts by weight of 80% phosphoric acid were added to the mixer from a phosphoric acid surge tank above the mixer. A 3-inch discharge valve was used on the bottom of the surge tank so that the acid could be added quickly and acid addition was complete in 10–15 seconds. After the acid addition was complete, mixing was continued for about 5–10 seconds to insure complete wetting and the mixture was then stopped. The reaction mass was a slurry having the consistency of split pea soup. The reaction mass began to bubble and then to bubble and steam as the boiling point of the mixture was reached. Large quantities of steam and carbon dioxide escaped for a short period of time. This bubbling mass then subsided forming a porous mass, which was maintained in the quiescent state for about 30 minutes. The mixer was then started and the porous mass broke into small granules having a size of about 12–30 mesh.

A typical analysis of the product resulting from the above process is as follows:

| | |
|---|---|
| Moisture _____percent__ | 2.00 |
| Total calcium (Ca) _____do____ | 19.3 |
| Fluoride _____p.p.m__ | 165 |
| pH _____ | 3.60 |
| Total phosphorus (P) _____percent__ | 17.68 |
| Available phosphorus after neutral ammonium citrate _____percent__ | 17.68 |
| Phosphorus available in 2% citric acid ____do____ | 17.63 |
| Phosphorus available in 0.4% HCl _____do____ | 17.68 |
| Insoluble phosphorus _____ | Nil |

The amount of phosphorus and calcium in the product may vary depending on the relative amounts of calcium and phosphorus in the starting materials. The product formed according to this invention has a high water solubility, e.g., 85%, and that fact along with chemical analysis indicates that an unexpectedly large amount of monocalcium phosphate is formed although the dicalcium phosphate predominates. Monocalcium is more expensive and more desirable than di and tri calcium forms and the formation of relatively large amounts of monocalcium phosphate is an important advantage of this process over prior art methods which result in a much lower percentage of monocalcium phosphate.

The final product normally has a bulk density of about 63 lbs./ft.³ and this low density is desirable. The size of the particles is illustrated by the following typical analysis:

| Percent of granules passing screen: | Mesh size |
|---|---|
| 2.5 | +8 |
| 5.0 | +10 |
| 14.3 | +16 |
| 19.0 | +20 |
| 39.5 | +28 |
| 59.4 | +35 |
| 84.7 | +65 |
| 92.1 | +100 |
| 97.3 | +270 |

Example 2

The process of Example 1 was repeated except that the mixer was not stopped after about 30 seconds but continued to rotate for 30 minutes. Initially, the slurry was of a fairly low viscosity just as the slurry in Example 1. However, as the reaction started, it quickly dried to a putty-like consistency and then after about 5 minutes, large particles, about the size of baseballs, were formed. After 30 minutes, the particles, especially on their outer surface, had become very hard and required hammering to granulate. The inside of the large particles, however, were still soft and could not be granulated. A portion of the particles was allowed to stand for several hours until the particles had hardened completely. At that point, they formed an extremely hard, non-porous, material which could be granulated only with great difficulty.

The foregoing examples are not to be taken as limiting the scope of the invention but rather are merely illustrative of various embodiments. Thus, a wide range of reactants and conditions may be used as long as the initial mixing step is terminated so that the reaction mass can be maintained in a quiescent state during substantially all of the reaction. The scope of this invention is, therefore, limited only by the lawful scope of the claims which follow.

I claim:

1. A method of forming granules of alkaline earth phosphates comprising mixing phosphoric acid and an alkaline earth carbonate to form a reaction mixture, stopping mixing within about 30 seconds, before there is any substantial reaction between the phosphoric acid and alkaline earth carbonate, maintaining said reaction mixture in a quiescent state immediately after said mixing for about one half hour until the reaction between said alkaline earth carbonate and phosphoric acid is substantially complete and breaking the reaction mass to form granules.

2. The method of claim 1 wherein said carbonate is calcium carbonate.

3. The method of claim 1 wherein said phosphoric acid is an aqueous solution containing about 84% phosphoric acid.

4. The method of claim 1 wherein said mixing is accomplished in a rotary drum mixer.

5. The method of claim 4 wherein said reaction product is granulated by rotating the reaction product in a rotary drum mixer.

6. The method of claim 1 wherein mixing is terminated while the mixture is a wet slurry.

7. The method of claim 1 wherein said reaction product is granulated by dropping it through a short distance.

8. The method of claim 1 wherein said carbonate contains from about 10% to 90% calcium oxide.

9. The method of claim 4 wherein aqueous phosphoric acid is added to said alkaline earth carbonate in a rotating mixer.

10. A method of forming granules of calcium phosphate comprising introducing calcium carbonate into a rotary drum mixer, rotating the mixer, adding aqueous phosphoric acid while the mixer is rotating to form a reaction mixture, stopping mixing within about 30 seconds before there is any substantial reaction between the phosphoric acid and calcium carbonate, maintaining said reaction mixture in a quiescent state immediately after said mixing for about one half hour until the reaction between said calcium carbonate and phosphoric acid is substantially complete and breaking the reaction mass to form granules.

References Cited

UNITED STATES PATENTS 3,236,593   2/1966   Hartmann et al. _____ 23—109

EARL C. THOMAS, *Primary Examiner.*

L. A. MARSH, *Assistant Examiner.*